(12) United States Patent
Sutardja

(10) Patent No.: US 8,521,928 B2
(45) Date of Patent: Aug. 27, 2013

(54) CIRCUIT WITH MEMORY AND SUPPORT FOR HOST ACCESSES OF STORAGE DRIVE

(71) Applicant: Marvell World Trade Ltd., St. Michael (BB)

(72) Inventor: Sehat Sutardja, Los Altos, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/710,814

(22) Filed: Dec. 11, 2012

(65) Prior Publication Data

US 2013/0097344 A1 Apr. 18, 2013

Related U.S. Application Data

(63) Continuation of application No. 13/154,356, filed on Jun. 6, 2011, now Pat. No. 8,332,555, which is a continuation of application No. 10/926,486, filed on Aug. 19, 2004, now Pat. No. 7,958,292.

(60) Provisional application No. 60/582,259, filed on Jun. 23, 2004.

(51) Int. Cl.
*G06F 13/12* (2006.01)
*G06F 12/00* (2006.01)

(52) U.S. Cl.
USPC .............. 710/74; 710/29; 710/36; 711/114; 711/112

(58) Field of Classification Search
USPC .............. 710/74, 29, 36; 711/114, 112
See application file for complete search history.

(56) References Cited

U.S. PATENT DOCUMENTS

| | | | |
|---|---|---|---|
| 6,256,684 B1 * | 7/2001 | Klein | 710/35 |
| 6,988,151 B2 | 1/2006 | Tsuruta | |
| 7,200,074 B2 | 4/2007 | Kano et al. | |
| 7,234,005 B2 | 6/2007 | Yoshitake | |
| 7,373,456 B2 | 5/2008 | Yamazaki et al. | |
| 7,453,774 B2 | 11/2008 | Kano et al. | |
| 7,461,203 B2 | 12/2008 | Suzuki et al. | |
| 2003/0023815 A1 | 1/2003 | Yoneyama et al. | |
| 2005/0005063 A1 | 1/2005 | Liu et al. | |
| 2005/0108452 A1 | 5/2005 | Loffink | |
| 2005/0120173 A1 | 6/2005 | Minowa | |
| 2005/0177681 A1 | 8/2005 | Fujimoto et al. | |
| 2005/0182874 A1 | 8/2005 | Herz et al. | |
| 2006/0095813 A1 | 5/2006 | Yagisawa et al. | |
| 2008/0040543 A1 | 2/2008 | Yamazaki et al. | |
| 2008/0172528 A1 | 7/2008 | Yagisawa et al. | |

* cited by examiner

*Primary Examiner* — Ernest Unelus

(57) ABSTRACT

A circuit including a first memory and a processor. The processor is configured to receive data from a host device and transfer the data from the circuit to a storage drive. The processor is configured to receive the data back from the storage drive when a second memory in the storage drive does not have available space for the data, and prior to the data being transferred from the second memory to a third memory in the storage drive. The processor is configured to: store the data received from the storage drive in the first memory or transfer the data received from the storage drive back to the host device; and based on a request received from the storage drive, transfer the data from the first memory or the host device back to the storage drive. The request indicates that space is available in the second memory for the data.

20 Claims, 11 Drawing Sheets

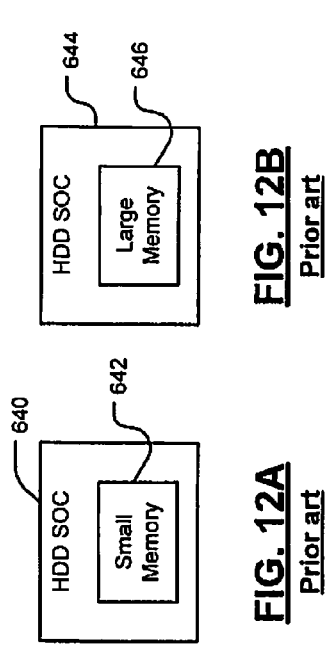
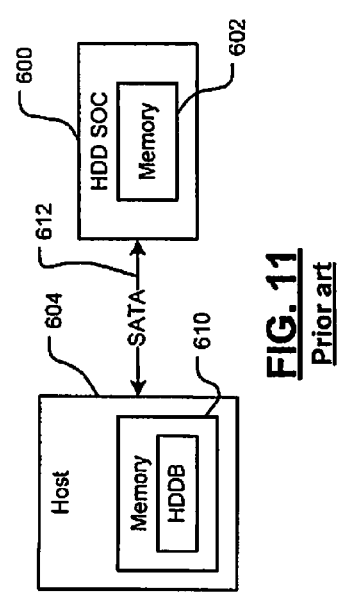
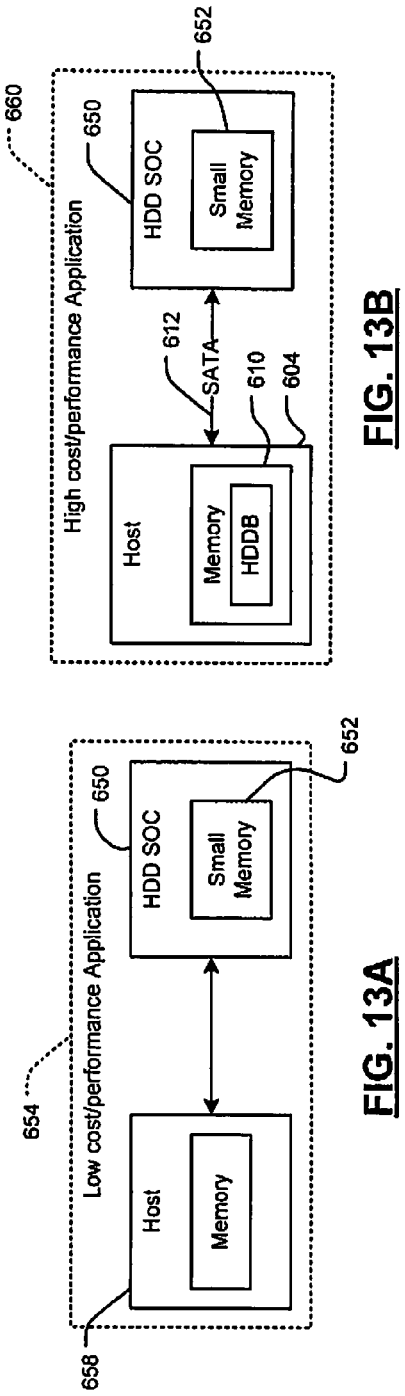

CIRCUIT WITH MEMORY AND SUPPORT FOR HOST ACCESSES OF STORAGE DRIVE

CROSS-REFERENCE TO RELATED APPLICATIONS

This present disclosure is a continuation of U.S. application Ser. No. 13/154,356, filed Jun. 16, 2011 (now U.S. Pat. No. 8,333,555) which is a continuation of U.S. application Ser. No. 10/926,486, filed Aug. 18, 2004 (now U.S. Pat. No. 7,958,292), which claims priority under 35 U.S.C. §119(e) to U.S. Provisional Application No. 60/582,259, filed on Jun. 23, 2004. The disclosures of the applications referenced above are incorporated herein by reference.

TECHNICAL FIELD

The present disclosure relates to hard disk drives, and more particularly to increasing buffer memory of an HDD system on chip (SOC) and to improved enterprise systems including HDD SOCs.

BACKGROUND

Host devices such as computers, laptops, personal video recorders (PVRs), MP3 players, game consoles, servers, set-top boxes, digital cameras, and/or other electronic devices often need to store a large amount of data. Storage devices such as hard disk drives (HDD) may be used to meet these storage requirements.

Referring now to FIG. 1, an exemplary hard disk drive (HDD) 10 is shown to include a hard disk drive (HDD) system on chip (SOC) 12 and a hard drive assembly (HDA) 13. The HDA 13 includes one or more hard drive platters 14 that are coated with magnetic layers 15. The magnetic layers 15 store positive and negative magnetic fields that represent binary 1's and 0's. A spindle motor, which is shown schematically at 16, rotates the hard drive platter 14. Generally the spindle motor 16 rotates the hard drive platter 14 at a fixed speed during read/write operations. One or more read/write actuator arms 18 move relative to the hard drive platter 14 to read and/or write data to/from the hard drive platters 14.

A read/write device 20 is located near a distal end of the read/write arm 18. The read/write device 20 includes a write element such as an inductor that generates a magnetic field. The read/write device 20 also includes a read element (such as a magneto-resistive (MR) element) that senses the magnetic field on the platter 14. A preamp circuit 22 amplifies analog read/write signals.

When reading data, the preamp circuit 22 amplifies low level signals from the read element and outputs the amplified signal to a read/write channel device 24. When writing data, a write current is generated which flows through the write element of the read/write device 20. The write current is switched to produce a magnetic field having a positive or negative polarity. The positive or negative polarity is stored by the hard drive platter 14 and is used to represent data.

The HDD SOC 12 typically includes a buffer 32 that stores data that is associated with the control of the hard disk drive and/or buffers data to allow data to be collected and transmitted as larger data blocks to improve efficiency. The buffer 32 may employ DRAM, SDRAM or other types of low latency memory. The HDD SOC 12 further includes a processor 34 that performs processing that is related to the operation of the HDD 10.

The HDD SOC 12 further includes a hard disk controller (HDC) 36 that communicates with a host device via an input/output (I/O) interface 38. The HDC 36 also communicates with a spindle/voice coil motor (VCM) driver 40 and/or the read/write channel device 24. The I/O interface 38 can be a serial or parallel interface, such as an Integrated Drive Electronics (IDE), Advanced Technology Attachment (ATA), or serial ATA (SATA) interface. The spindle/VCM driver 40 controls the spindle motor 16, which rotates the platter 14. The spindle/VCM driver 40 also generates control signals that position the read/write arm 18, for example using a voice coil actuator, a stepper motor or any other suitable actuator. The I/O interface 38 communicates with an I/O interface 44 that is associated with a host device 46.

Referring now to FIG. 2, an exemplary host device 64 is shown to include a processor 66 with memory 67 such as cache. The processor 66 communicates with an input/output (I/O) interface 68. Volatile memory 69 such as random access memory (RAM) 70 and/or other suitable electronic data storage also communicates with the interface 68. A graphics processor 71 and memory 72 such as cache increase the speed of graphics processing and performance.

One or more I/O devices such as a keyboard 73 and a pointing device 74 (such as a mouse and/or other suitable device) communicate with the interface 68. The computer architecture 64 may also include a display 76, an audio output device 77 such as audio speakers and/or other input/output devices that are generally identified at 78.

In use, the HDD is operated independently from the host device. The hard disk drive handles buffering of data locally to improve performance. This approach requires the hard disk drive to include low latency RAM such as DRAM, which increases the cost of the hard disk drive.

Referring now to FIG. 3, a desktop HDD SOC 200 for a host device such as a desktop computer is shown. The HDD SOC 200 includes a processor 204, a hard disk controller (HDC) 208, a read/write channel circuit 212, memory 216 (which can be implemented on chip and/or off chip), and a high speed interface 220. For example, the high speed interface 220 can be a serial or parallel interface such as an ATA and/or SATA interface that communicates with a host device 224. In this implementation, the spindle/VCM driver is shown integrated with the processor 204. The HDA 13 interfaces with the processor 204 and the read/write channel circuit 212. A host device 226 includes an ATA/SATA interface 228, which communicates with the ATA/SATA interface 220. Operation of the HDD SOC 220 is similar to that described above in conjunction with FIG. 1.

Referring now to FIG. 4, an enterprise HDD SOC 230 for an enterprise device 232 such as a server or other enterprise devices is shown. The HDD SOC 230 includes a spindle/VCM/Data processor 234 that performs processing related to the spindle motor, VCM and/or data processing. The HDD SOC 230 further includes an interface/data processor 236 that performs processing related to the enterprise device interface. The HDD SOC 230 also includes a hard disk controller (HDC) 238, a read/write channel circuit 242, memory 246 (which can be implemented on chip) and a high speed interface 250. For example, the high speed interface 250 can be a serial or parallel interface such as a small computer system interface (SCSI), serial attached SCSI (SAS) or Fiber Channel (FC) interface that communicates with the enterprise device 232 via a high speed interface 251.

Because of the different number of processors and the different output side interfaces that are used, manufacturers have designed and manufactured two different HDD SOC architectures for enterprise and desktop applications. In particular, the desktop HDD SOC 200 includes a single processor while the enterprise HDD SOC 230 includes two processors. In addition, the desktop HDD SOC 200 typically employs an ATA and/or SATA interface while the enterprise server typically employs an SAS and/or FC interface. The separate architectures increase the design inventory and die costs of both devices.

SUMMARY

A circuit is provided and includes a first memory and a processor. The processor is configured to receive data from a host device and transfer the data from the circuit to a storage drive. The processor is further configured to receive the data back from the storage drive (i) when a second memory in the storage drive does not have available space for the data, and (ii) prior to the data being transferred from the second memory to a third memory in the storage drive. The processor is also configured to: store the data received from the storage drive in the first memory or transfer the data received from the storage drive back to the host device; and based on a request received from the storage drive, transfer the data from the first memory or the host device back to the storage drive. The request indicates that space is available in the second memory for the data.

In other features, a method is provided and includes receiving data from a host device at a circuit and transferring the data from the circuit to a storage drive. The data is received back from the storage drive (i) when a first memory in the storage drive does not have available space for the data, and (ii) prior to the data being transferred from the first memory to a second memory in the storage drive. The data received from the storage drive is stored in a third memory or transferring the data received from the storage drive back to the host device. The circuit includes the third memory. Based on a request received from the storage drive, the data is transferred from the third memory or the host device back to the storage drive. The request indicates that space is available in the second memory for the data.

A circuit for a storage device that communicates with a host device includes a first high speed interface. A storage controller communicates with the high speed interface. A buffer communicates with the storage controller. The storage device generates storage buffer data during operation and the storage controller is adapted to selectively store the storage buffer data in at least one of the buffer and/or in the host device via the high speed interface.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 11 is a functional block diagram of an HDD SOC with FIFO memory and host-based buffering according to the prior art;

FIGS. 12A and 12B are functional block diagrams of low cost/performance HDD SOC and higher performance HDD SOC according to the prior art;

FIG. 13A illustrates an HDD SOC for low cost applications that includes small local memory such as DRAM and that has a disabled host-based buffering function according to one implementation;

FIG. 13B illustrates an HDD SOC for higher performance/cost applications that includes small local memory such as DRAM and that has an enabled host-based buffering function according to another implementation;

FIG. 15 illustrates an enterprise application that employs the same HDD SOC as FIG. 14.

DETAILED DESCRIPTION

Figure 1:
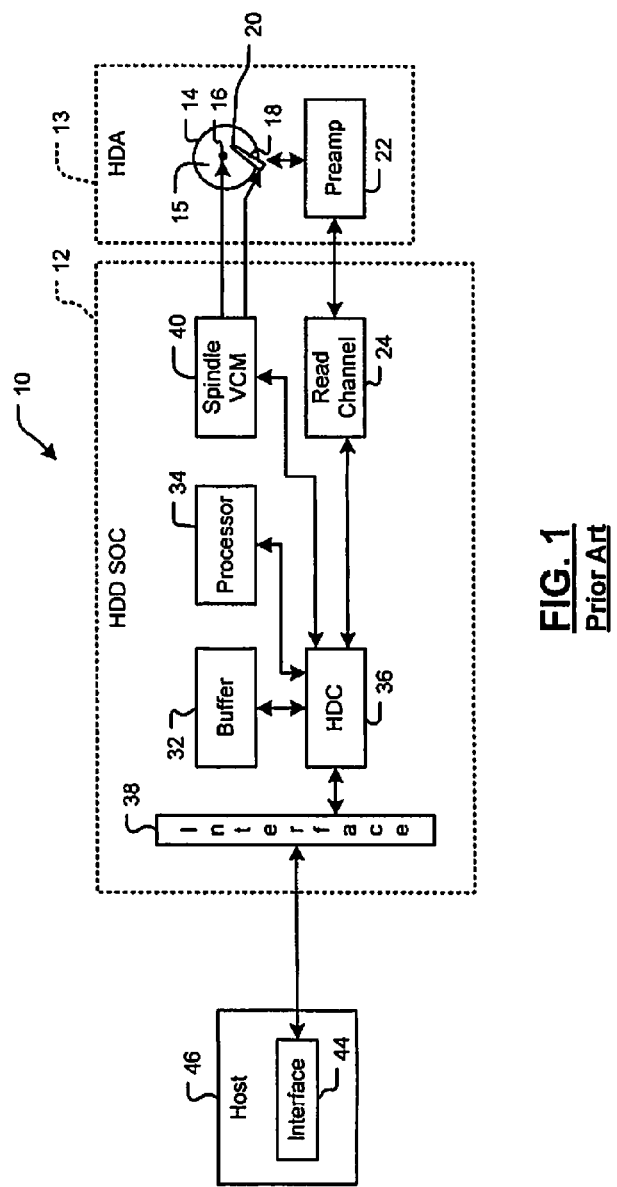
FIG. 1 is a functional block diagram of an exemplary hard disk drive system on chip (SOC) according to the prior art.
Figure 2:
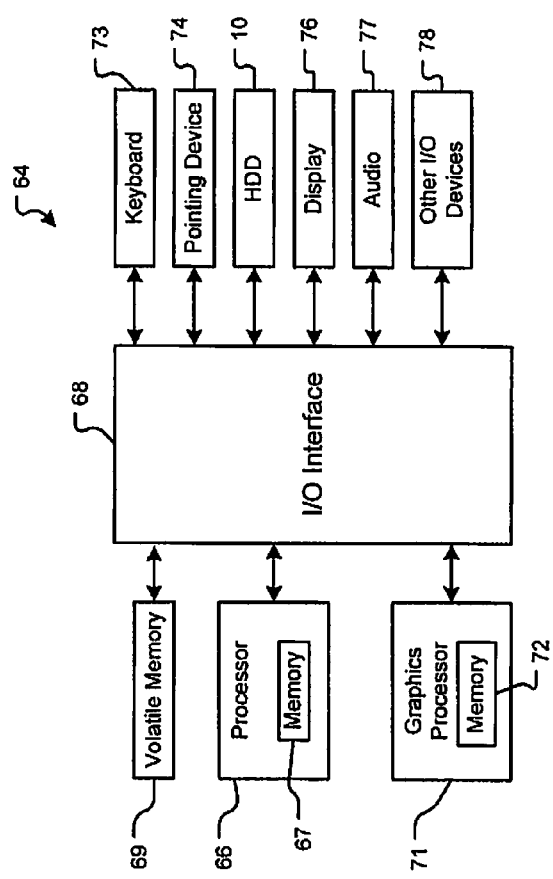
FIG. 2 is a functional block diagram of an exemplary host device according to the prior art.
Figure 3:
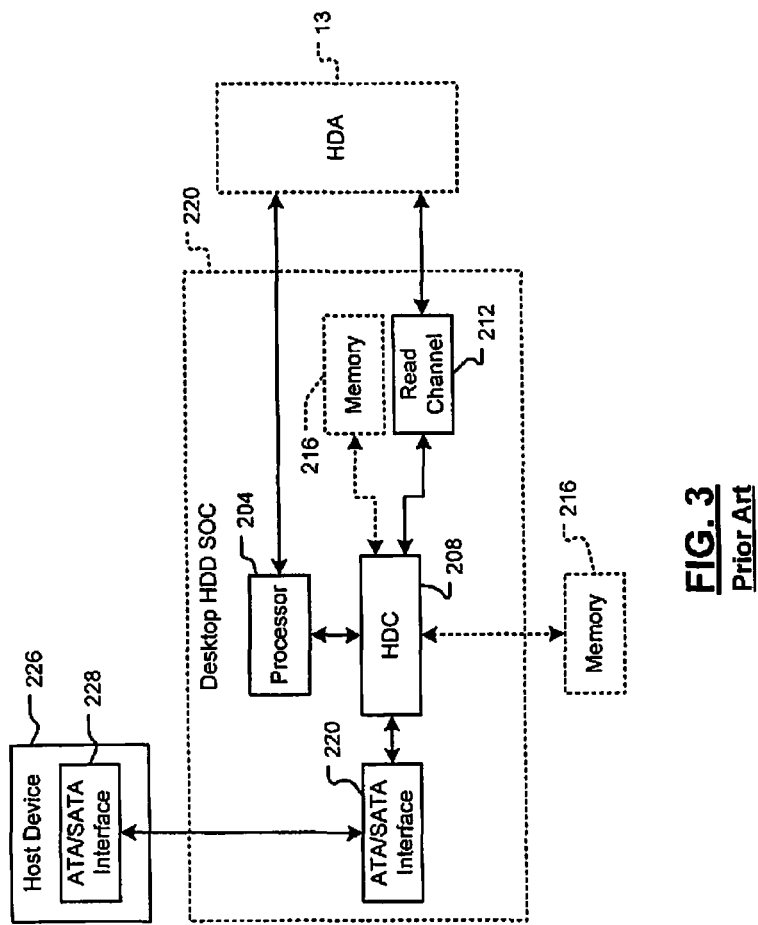
FIG. 3 is a functional block diagram of a desktop HDD SOC according to the prior art.
Figure 4:
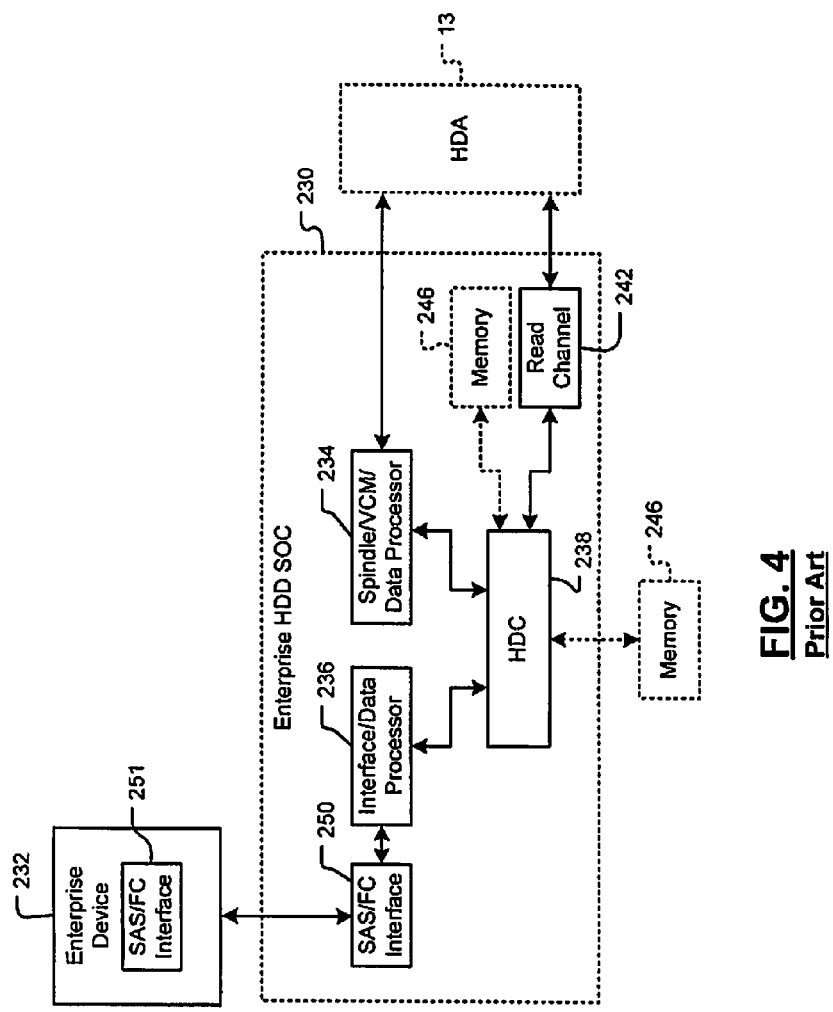
FIG. 4 is a functional block diagram of an enterprise HDD SOC according to the prior art.

For purposes of clarity, the same reference numbers will be used in the drawings to identify similar elements. While SOCs are disclosed herein, skilled artisans will appreciate that the SOCs may be implemented as multi-chip modules.

Figure 5:
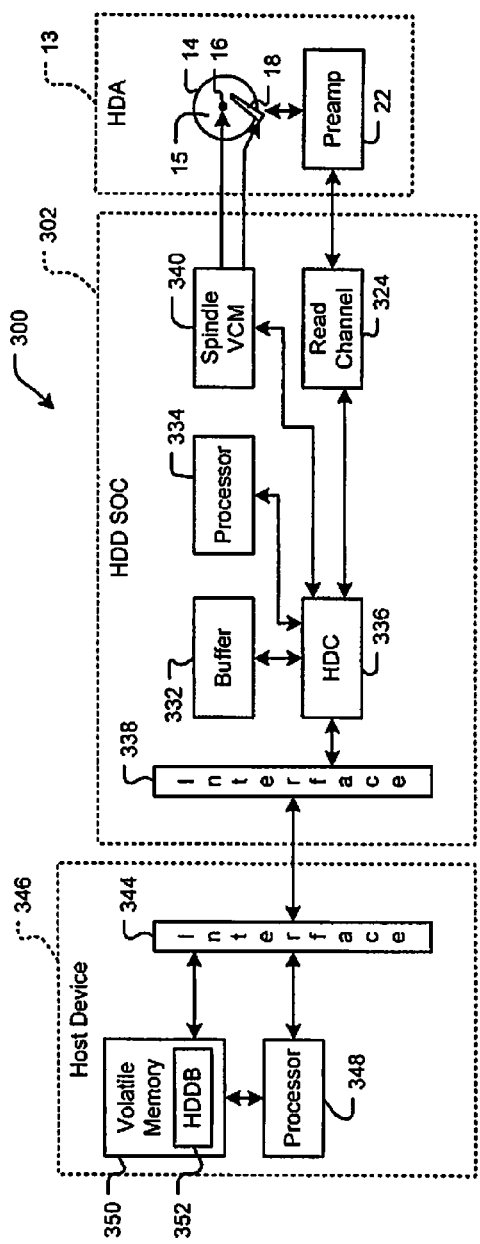
FIG. 5 is a functional block diagram of an exemplary implementation of a hard disk drive SOC that includes an on-chip buffer and that employs volatile memory of the host device for additional HDD buffering.

Referring now to FIG. 5, a system 300 includes a HDD SOC 302 according to the present disclosure. The HDD SOC 302 includes a buffer 332 that stores data that is associated with the control of the HDD and/or buffers data to allow data to be collected and transmitted as larger data blocks to improve efficiency. The buffer 332 may employ DRAM or other types of low latency memory. The HDD SOC 302 further includes a processor 334 that performs processing that is related to the operation of the HDD 300, such as spindle/VCM control processing.

The HDD SOC 302 further includes a hard disk controller (HDC) 336 that communicates with a host device via a high speed input/output (I/O) interface 338. The HDC 336 also communicates with a spindle/voice coil motor (VCM) driver 340 and/or the read/write channel device 324. The high speed I/O interface 338 can be a serial ATA (SATA) interface. The spindle/VCM driver 340 controls the spindle motor 16, which rotates the platter 14. The spindle/VCM driver 340 also generates control signals that position the read/write arm 18, for example using a voice coil actuator, a stepper motor or any other suitable actuator. The high speed I/O interface 338 communicates with a high speed I/O interface 344 that is associated with a host device 346.

The host device 346 includes a processor 348 and volatile memory 350. The host device 346 and the HDD SOC 302 allocate part of the volatile memory 350 for a host disk drive buffer (HDDB) 352. The HDD SOC 302 also includes the buffer 332. When additional RAM is needed for buffering, the HDD SOC 302 transmits/receives data over the high speed interface 338 to/from the HDDB 352 located in the volatile memory 350 of the host device 346. For example, nominal speeds of 3 Gb/s and higher can be obtained using a SATA interface. As can be appreciated, the ability to use the buffer 332 on the HDD SOC 302 as well as HDDB 352 of the host device 346 significantly increases the flexibility of the HDD SOC 302. Furthermore, by also including the buffer 332 on the HDD SOC 302, the HDD SOC 302 can also be used in applications that do not enable the HDDB 352.

In one implementation, the host device 346 includes an operating system that allows a user to allocate a variable amount of memory for the HDDB 352 from the volatile memory 350 of the host device 346. In another implementation, the volatile memory 350 is allocated automatically and/or a fixed amount of memory is available for the HDDB 352.

Figure 6:
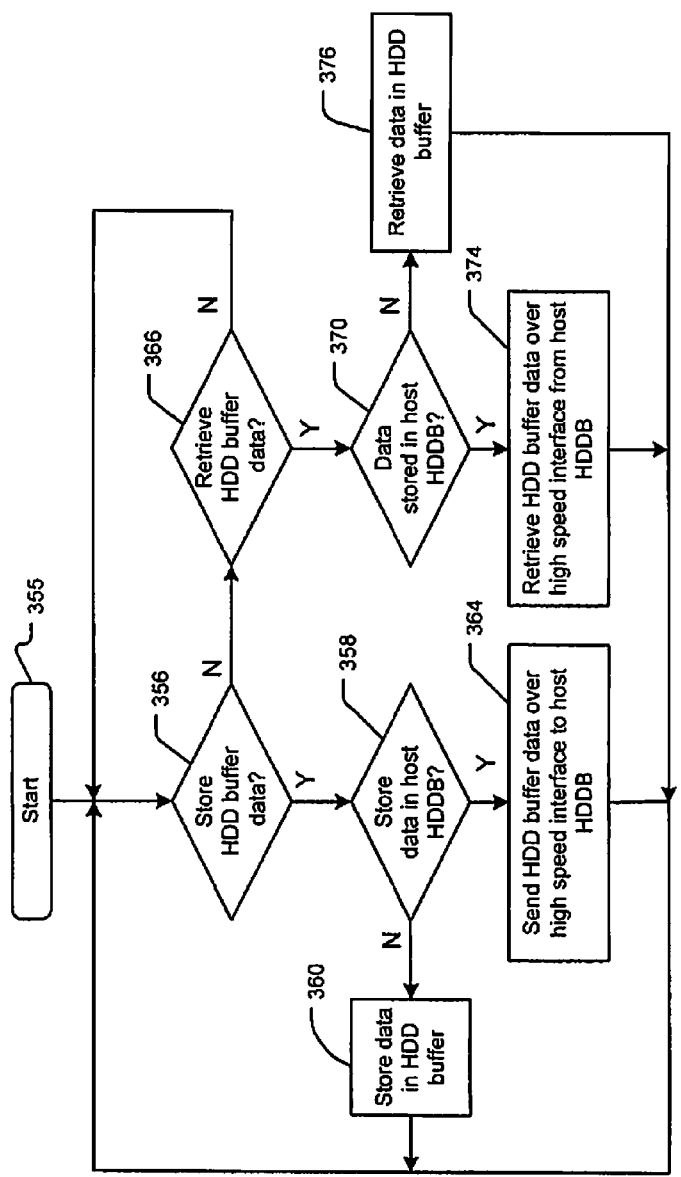
FIG. 6 is a flowchart illustrating steps of an exemplary method for storing and retrieving hard drive buffer data from the volatile memory of the host device.

Referring now to FIG. 6, a method for storing and retrieving hard drive buffer data from the volatile memory 350 of the host device 346 is shown. Control begins in step 355. In step 356, control determines whether there is a request to store buffer data in a HDD buffer. If true, control continues with step 358 and determines whether there is a request to store buffer data in the host HDDB. If step 358 is false, control stores buffer data in the HDD buffer 332 in the HDD SOC 302. If step 358 is true, control sends buffer data over the high speed interface 338 and 344 to the host HDDB 352 in step 364 and control returns to step 356.

If step 356 is false, control determines whether there is a request to retrieve buffer data stored in the HDD buffer data in step 366. If false, control returns to step 354. If step 366 is true, control determines whether the buffer data is stored in the host HDDB 352 in step 370. If step 370 is false, control retrieves buffer data in the HDD buffer 332 of the HDD SOC 302 in step 376 and control returns to step 356. If step 370 is true, control retrieves HDD buffer data over the high speed interface 338 and 344 from the host HDDB 352 in step 374.

As can be appreciated, the HDD SOC 302 provides flexibility to allow use in host device applications that use the SATA interface and host memory for HDD buffering as well as applications that do not.

Figure 7:
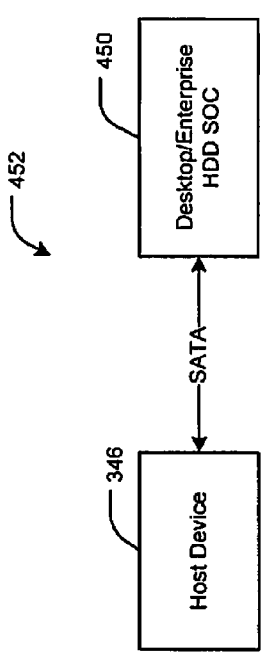
FIG. 7 is a functional block diagram of an exemplary implementation of a desktop/enterprise SOC implemented in a desktop application.
Figure 8:
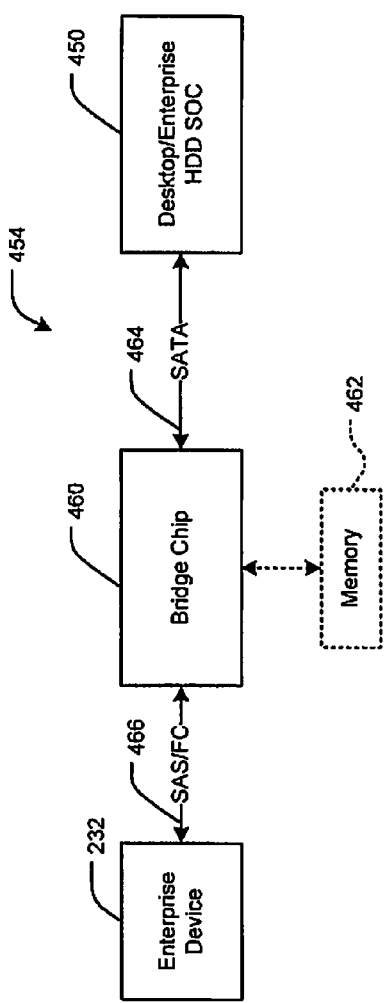
FIG. 8 is an exemplary functional block diagram of the desktop/enterprise SOC and a bridge chip implemented in an enterprise application.

A system according to the present disclosure includes an HDD SOC and a bridge chip that can be used for enterprise applications. The HDD SOC can also be used for desktop applications. Referring now to FIGS. 7 and 8, a desktop/enterprise HDD SOC 450 can be used for both desktop and enterprise applications 452 and 454, respectively, to reduce cost. The desktop/enterprise HDD SOC 450 communicates with the host device 346. The desktop/enterprise HDD SOC 450 selectively utilizes the volatile memory of the host device 346 as the HDDB 352 as described above.

In FIG. 8, the desktop/enterprise HDD SOC 450 communicates with a bridge chip 460 and memory 462 via an SATA interface 464. The memory 462 can be DRAM or other low latency memory. The bridge chip 460 performs SAS/FC to SATA conversion. The HDD SOC 450 uses a software ATA-like protocol to allocate the buffer memory requirements between the memory 486 and the memory 462. Generally, the buffer 462 will be used when the capacity of the memory 486 associated with the HDD SOC 450 is exceeded. Other adaptive techniques may be used to determine the buffer memory allocation and use.

In some implementations, a faster processor can be used for enterprise applications and premium desktop applications while lower speed processors can be used for desktop applications and low cost enterprise applications. The ability to use the same SOC for desktop and enterprise applications allows the benefits of additional volume that is associated with desktop applications to be shared by the generally lower volumes that are associated with enterprise applications. Furthermore, since the same SOCs can be used for both, only one SOC needs to be stored in inventory for both applications.

Figure 9:
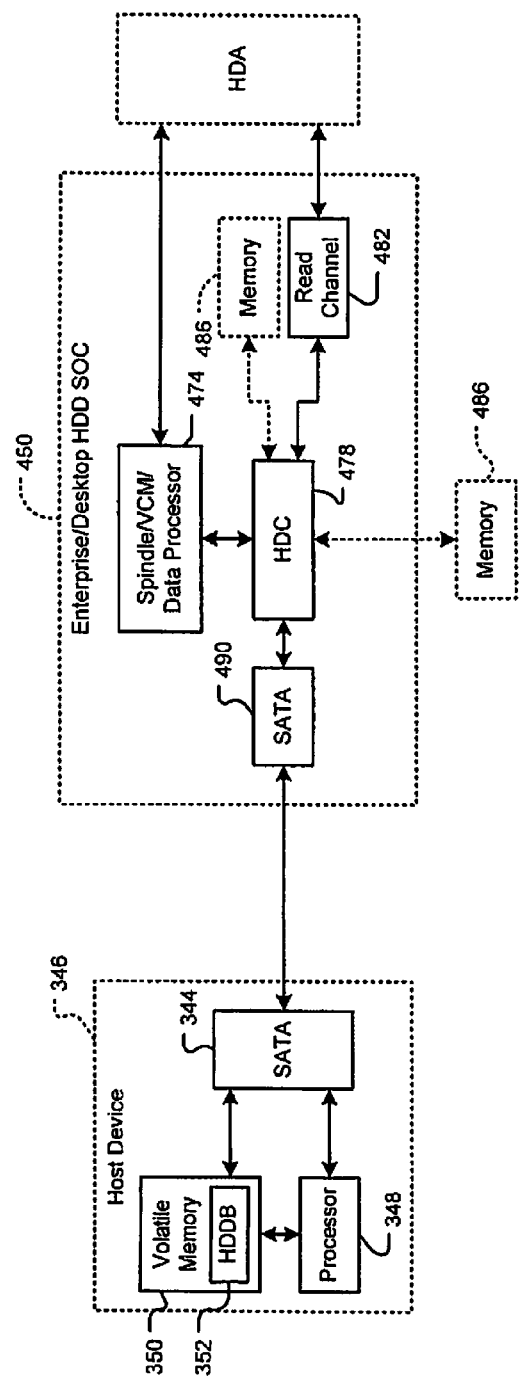
FIG. 9 is a more detailed block diagram of the desktop/enterprise SOC of FIG. 7 implemented in a desktop application.

Referring now to FIG. 9, the desktop/enterprise HDD SOC 450 communicates with the host device 346. The desktop/enterprise HDD SOC 450 selectively utilizes the HDDB 352 as buffer memory when needed as described above. When additional RAM is needed for buffering, the desktop/enterprise HDD SOC 450 transmits/receives data over the high speed interface 344 and 490 to/from the HDDB 352 located in the volatile memory 350 of the host device 346. As can be appreciated, the ability to use the buffer memory 486 on the desktop/enterprise HDD SOC 450 as well as HDDB 352 of the host device 346 significantly increases the flexibility of the desktop/enterprise HDD SOC 450. Furthermore, by also including the buffer 486 on the desktop/enterprise HDD SOC 450, the desktop/enterprise HDD SOC 450 can also be used in applications that do not enable the HDDB 352.

Figure 10:
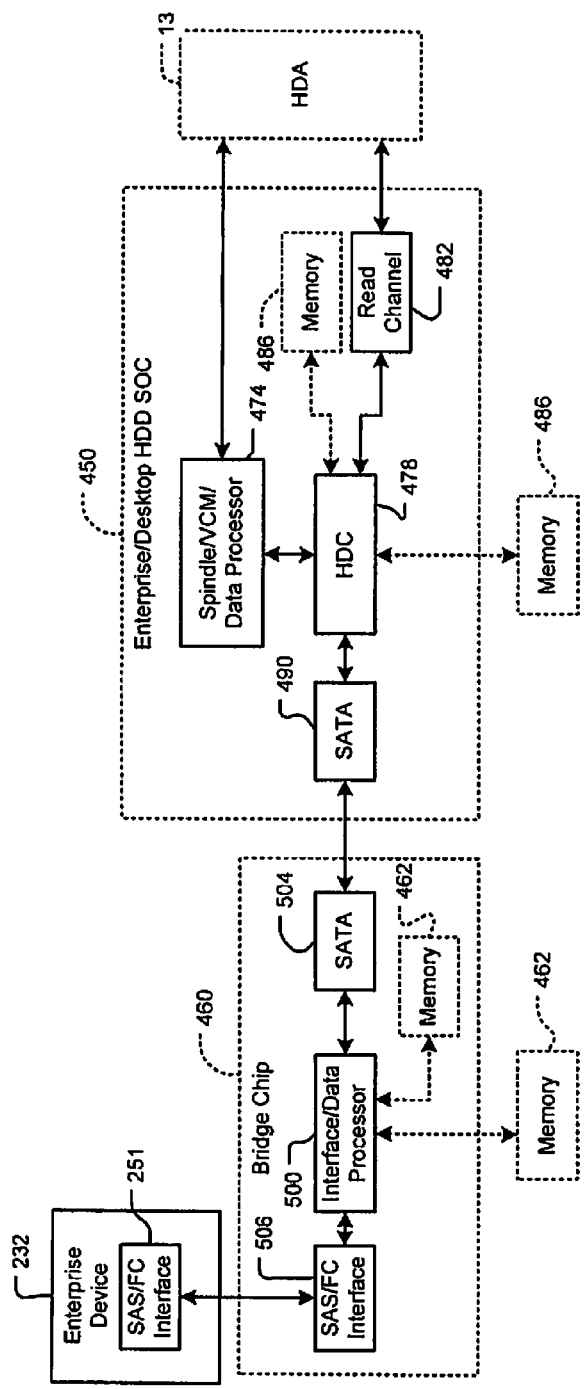
FIG. 10 is a more detailed functional block diagram of the desktop/enterprise SOC and the bridge chip of FIG. 8.

Referring now to FIG. 10, the desktop/enterprise HDD SOC 450 is shown. The desktop/enterprise HDD SOC 450 includes a processor 474, a hard disk controller (HDC) 478, a read/write channel circuit 482, memory 486 (which can be implemented on chip and/or off chip), and a high speed interface 490. The memory can be low latency memory such as DRAM or other low latency memory. The memory 486 can include embedded 1-T DRAM memory. The high speed interface 490 can be a SATA interface that communicates with the host device 424 in desktop applications (as shown in FIGS. 7 and 9) or a bridge chip 460 as shown in FIGS. 8 and 10. The bridge chip 460 includes an SAS/FC/Data processor 500 and an SATA interface 504. Memory 462 can be on chip and/or off chip as shown. The memory 462 can be low latency memory such as DRAM or other low latency memory. The SAS/FC/Data processor 500 communicates with the enterprise device 232 via interfaces 506 and 251. The interfaces 506 and 251 can be SAS/FC interfaces and the enterprise device 232 can be a server.

Some host devices cannot currently handle host-based buffer memory for the HDD SOC. In other words, there will be a transition period between an old business model and a new business model. In the old business model, the host device does not have drivers that support host-based buffering and the HDD SOC and/or MCM have sufficient buffer memory to support HDD operations. In the new business model, the HDD SOC and/or MCM have very small FIFO memory and the host has drivers that support host-based buffering. Implementations of the present disclosure can make the transition between the old and new business models.

Referring now to FIG. 11, an HDD SOC 600 that is designed for host-based buffering usually includes a very small memory 602 that is typically used only for FIFO purposes. The memory 602 typically has a capacity that is less than 1 MB, for example some HDD SOC 600 include approximately 32 kB of memory. A host 604 includes memory 610 that supports host-based buffering over a high speed interface 612 such as but not limited to the SATA that is shown. When these HDD SOCs 600 are used with hosts 604 that do not support host-based buffering, system performance degrades significantly due to the small size of the memory 602, which cannot support high speed operation.

Referring now to FIGS. 12A and 12B, low cost/performance HDD SOCs 640 that are not designed for host-based buffering typically use greater than 4 MB of memory 642 and less than 64 MB. For example, 16 MB of memory may be used. Higher cost/performance HDD SOCs 644 typically use greater than or equal to 64 MB of memory 646.

Referring now to FIGS. 13A and 13B, an HDD SOC 650 according to the present disclosure includes memory 652 with no external interface for additional memory. The memory 652 can be DRAM and can have a capacity of 16 MB. The HDD SOC 650 according to the present disclosure selectively enables host-based buffering. For lower cost/performance applications 654, the HDD SOC 650 utilizes the memory 652 and host-based buffering with a host 658 is disabled as shown in FIG. 13A. In higher cost/performance applications 660, the HDD SOC 650 utilizes the memory 652 and host-based buffering is enabled as shown in FIG. 13B.

One benefit of this approach is the ability to eliminate external pins on the HDD SOC 650 for memory expansion. Therefore smaller dies can be used and fabrication costs are reduced since pads are expensive to fabricate (particularly for CMOS≦90 nm). Pads may also require electrostatic discharge protection (ESD), which also increases fabrication and design costs.

Figure 14:
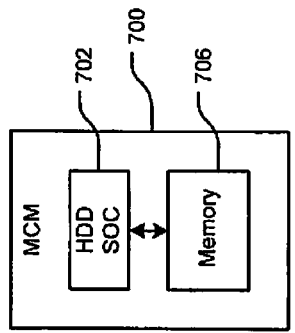
FIGS. 14 and 15 illustrate an MCM with an HDD SOC and a small local memory such as DRAM.
Figure 15:
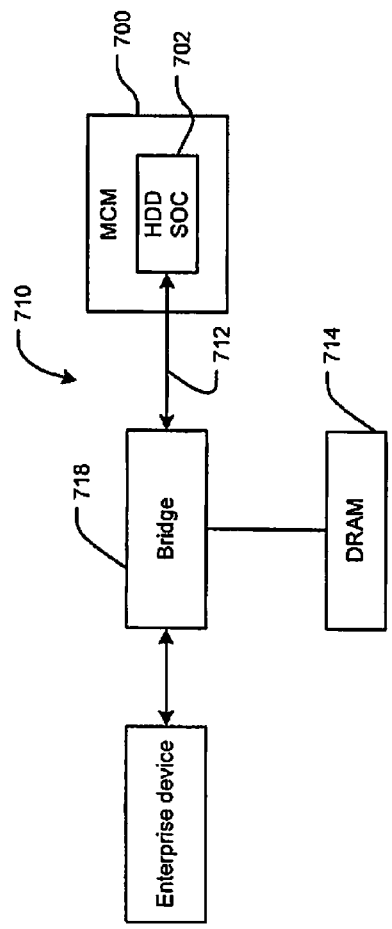

Referring now to FIGS. 14 and 15, for HDD MCM, pads can be made smaller, which poses a lower ESD concern. Furthermore, a single die can be used for HDD MCM to handle applications with no local HDD memory and for applications with local HDD memory. For example, an HDD MCM 700 can include the HDD SOC 702 and memory 704 for desktop applications. The same HDD SOC 700 can be used in enterprise applications 710 with or without using the memory 706. In this case, the HDD SOC 702 uses a high speed interface 712 such as SATA to memory 714 that is associated with a bridge circuit 718 as described above.

As can be appreciated, the HDD SOCs 450, 460 and 302 can be packaged as multi-chip modules if desired. While implementations of the present disclosure have been described in conjunction with magnetic storage systems, skilled artisans will appreciate that the implementations disclosed herein may also be used in conjunction with optical and/or other data read only and/or read/write systems. Those skilled in the art can now appreciate from the foregoing description that the broad teachings of the present disclosure can be implemented in a variety of forms. Therefore, while the implementations have been described in connection with particular examples thereof, the true scope of the disclosure should not be so limited since other modifications will become apparent to the skilled practitioner upon a study of the drawings, the specification and the following claims.

What is claimed is:

1. A circuit comprising:
a first memory; and
a processor configured to
receive data from a host device,
transfer the data from the circuit to a storage drive,
receive the data back from the storage drive (i) when a second memory in the storage drive does not have available space for the data, and (ii) prior to the data being transferred from the second memory to a third memory in the storage drive,
store the data received from the storage drive in the first memory or transfer the data received from the storage drive back to the host device, and
based on a request received from the storage drive at the circuit or the host device, transfer the data from the first memory or the host device back to the storage drive, wherein the request indicates that space is available in the second memory of the storage drive for the data.

2. The circuit of claim 1, further comprising:
a first interface in communication with the host device; and
a second interface in communication with storage drive,
wherein the processor is connected between the first interface and the second interface and is configured to receive the data from the host device via the first interface, and transfer the data from the circuit to the storage drive via the second interface.

3. The circuit of claim 2, wherein:
the first interface is a desktop interface;
the second interface is an enterprise interface; and
the processor is configured to convert the data between a desktop format and an enterprise format when transferring the data between the host device and the storage drive.

4. The circuit of claim 2, wherein:
the first interface is a desktop interface;
the second interface is an enterprise interface; and
the processor is configured to convert the data between a desktop format and an enterprise format when transferring the data between the host device and the storage drive.

5. The circuit of claim 2, wherein:
the host device is separate from the circuit; and
the storage drive is separate from the host device and the circuit.

6. The circuit of claim 2, wherein:
the first interface is one of an advanced technology attachment interface and a serial advanced technology attachment interface; and
the second interface is one of a small computer system interface, a serial attached small computer system interface, and a fiber channel interface.

7. The circuit of claim 2, wherein:
the first interface is one of a small computer system interface, a serial attached small computer system interface, and a fiber channel interface; and
the second interface is one of an advanced technology attachment interface and a serial advanced technology attachment interface.

8. The circuit of claim 1, wherein:
the second memory comprises non-volatile semiconductor memory; and
the third memory comprises a magnetic storage medium.

9. A system comprising:
a circuit comprising
a first memory,
a processor configured to
receive data from a host device,
transfer the data from the circuit to a storage drive,
receive the data back from the storage drive (i) when a second memory in the storage drive does not have available space for the data, and (ii) prior to the data being transferred from the second memory to a third memory in the storage drive,
store the data received from the storage drive in the first memory or transfer the data received from the storage drive back to the host device, and
based on a request received from the storage drive at the circuit or the host device, transfer the data from the first memory or the host device back to the storage drive, wherein the request indicates that space is available in the second memory of the storage drive for the data, and the storage drive, wherein the storage drive comprises
- a system on chip comprising an interface in communication with the circuit, and
- a controller configured to (i) store the data in the second memory prior to storing the data in the third memory, and (ii) transmit and receive the data to and from the circuit via the interface.

10. The system of claim 9, wherein:
the controller is configured to receive the data from a fourth memory in the host device via the circuit and the interface; and
the fourth memory of the host device is separate from the circuit and the storage drive.

11. The system of claim 9, wherein the controller is configured to:
- determine whether the second memory has available space for the data; and
- transfer the data back to the circuit (i) when the second memory does not have available space for the data and (ii) prior to storing the data in the third memory.

12. The system of claim 9, further comprising:
a driver in communication with the controller;
a second circuit in communication with the controller; and
a storage assembly comprising
- the third memory, wherein the third memory comprises a disk,
- a spindle motor in communication with the driver and configured to rotate the disk, and
- a read and write arm in communication with the second circuit and configured to read the data from and write the data to the disk.

13. The system of claim 9, further comprising the host device, wherein the host device comprises:
a second interface; and
a fourth memory configured to store the data received from the storage drive via the circuit and prior to the data being stored in the third memory.

14. The system of claim 13, wherein the fourth memory comprises volatile memory.

15. The system of claim 13, wherein:
the host device allocates
- a first portion of the fourth memory of the host device to the host device, and
- a second portion of the fourth memory of the host device to the storage drive; and
the second portion is used solely by the storage drive.

16. The system of claim 9, wherein the system on chip comprises:
the second memory;
the controller;
a driver in communication with the controller; and
a second circuit in communication with the controller.

17. A method comprising:
receiving, via a processor, data from a host device at a circuit;
transferring the data from the circuit to a storage drive;
receiving the data back from the storage drive (i) when a first memory in the storage drive does not have available space for the data, and (ii) prior to the data being transferred from the first memory to a second memory in the storage drive;
storing the data received from the storage drive in a third memory or transferring the data received from the storage drive back to the host device, wherein the circuit comprises the third memory; and
based on a request received from the storage drive at the circuit or the host device, transferring the data from the third memory or the host device back to the storage drive, wherein the request indicates that space is available in the second memory of the storage drive for the data.

18. The method of claim 17, comprising converting the data between a desktop format and an enterprise format when transferring the data between the host device and the storage drive.

19. The method of claim 17, further comprising:
storing the data in the first memory via a controller of the storage drive prior to storing the data in the second memory;
transmitting and receiving the data to and from the circuit via an interface between the circuit and the storage drive; and
receiving at the controller the data from a fourth memory via the circuit and the interface, wherein host device comprises the fourth memory,
wherein the fourth memory of the host device is separate from the circuit and the storage drive.

20. The method of claim 19, further comprising:
determining, via the controller, whether the first memory has available space for the data; and
transferring the data back to the circuit (i) when the first memory does not have available space for the data and (ii) prior to storing the data in the second memory.

* * * * *